United States Patent [19]

Davidovits et al.

[11] Patent Number: 5,342,595

[45] Date of Patent: Aug. 30, 1994

[54] PROCESS FOR OBTAINING A GEOPOLYMERIC ALUMINO-SILICATE AND PRODUCTS THUS OBTAINED

[76] Inventors: Joseph Davidovits, 16 rue Galilée, Saint Quentin F-02100; Michel Davidovics, 5 Route de Villers, Pont Ste Maxence F-60700; Nicolas Davidovits, 6 rue Brison, Roanne F-42300, all of France

[21] Appl. No.: 923,797

[22] PCT Filed: Mar. 5, 1991

[86] PCT No.: PCT/FR91/00177

§ 371 Date: Sep. 2, 1992

§ 102(e) Date: Sep. 2, 1992

[87] PCT Pub. No.: WO91/13830

PCT Pub. Date: Sep. 19, 1991

[30] Foreign Application Priority Data

Mar. 7, 1990 [FR] France .................................. 90 02853
Jan. 3, 1991 [FR] France .................................. 91 00027

[51] Int. Cl.$^5$ .............................................. C01B 33/26
[52] U.S. Cl. ........................... 423/328.1; 423/327.1; 423/332; 106/286.5
[58] Field of Search ................. 423/328.1, 331, 332, 423/327.1; 106/286.5, 287

[56] References Cited

U.S. PATENT DOCUMENTS

| | | | |
|---|---|---|---|
| 4,509,985 | 4/1985 | Davidovits et al. | 106/624 |
| 4,888,311 | 12/1989 | Davidovits et al. | 501/153 |
| 5,194,091 | 3/1993 | Laney | 106/628 |

FOREIGN PATENT DOCUMENTS

| | | |
|---|---|---|
| 0059088 | 9/1982 | European Pat. Off. . |
| 82-00816 | 3/1982 | World Int. Prop. O. . |
| 88-02741 | 4/1988 | World Int. Prop. O. . |
| 89-02766 | 4/1989 | World Int. Prop. O. . |
| 91-13830 | 9/1991 | World Int. Prop. O. . |

OTHER PUBLICATIONS

Weldes et al,. "Properties of Soluble Silicates", Industrial & Engineering Chemistry, vol. 61, No. 4 (Apr. 1969) pp. 29-32.

(List continued on next page.)

*Primary Examiner*—Anthony G. McFarlane
*Attorney, Agent, or Firm*—Browdy and Neimark

[57] ABSTRACT

The geopolymeric alumino-silicates have been grouped in three families depending on the atomic ratio Si/Al which may be 1, 2 or 3. With the most commonly used simplified notation, a distinction is made between

| | | |
|---|---|---|
| poly (sialate) | $M_n(-Si-O-Al-O)_n$ | or (M)—PS, |
| poly (sialate-siloxo) | $M_n(-Si-O-Al-O-Si-O)_n$ | or (M)—PSS, |
| poly (sialate-disiloxo). | $M_n(-Si-O-Al-O-Si-O-Si-O)_n$ | or (M)—PSDS |

A process for obtaining a geopolymer of the alkaline poly(sialate-disiloxo) family (M)-PSDS with the ratio Si/Al=3 involves producing geopolymeric resin obtained from a reactional mixture containing:

a) an aqueous solution of alkaline silicate with a molar ratio $SiO_2:M_2O$ comprised between or equal to $SiO_2:M_2O$ 4.0:1 and 6.6:1 the concentration of which is over 60% wt and where the initial viscosity at 20° C. is 200 centipoises, then increases but does not exceed 500 centipoises before 5 hours at 20° C.;

b) an alumino-silicate oxide $(Si_2O_5,Al_2O_2)$ in which the Al cation is in coordination (IV–V), as determined by the MAS-NMR spectrum for $^{27}Al$, the said oxide being in such a quantity that the molar ratio $Al_2O_3:SiO_2$ is comprised between or equal to $Al_2O_3:SiO_2$ 1:5.5 and 1:6.5, and then allowing the geopolymeric resin to cure.

As against the prior art, the fact that there is no need to add fillers to prevent the geopolymeric matrix from cracking makes it possible to keep a very low viscosity in the geopolymeric resin and develop its film-forming property, which is a distinct advantage when fibers or other granular materials are to be impregnated.

20 Claims, No Drawings

OTHER PUBLICATIONS

Davidovits et al,. "Geopolymer: Room Temperature Ceramic Matrix for Composites", Ceram. Eng. Sci. Proc., vol. 9, pp. 835–842 (1988).

"Aluminum-27 and Silicon-29 Magic Angle Spinning Nuclear Magnetic Resonance Study of the Kaolinite–Mullite Transformation", Sanz et al, J. Am. Ceram. Soc. vol. 71, C–418–C–422, 1988.

Davidovits et al, "Structural Characterization of Geopolymeric Materials with X-ray Diffractometry and MAS-NMR Spectroscopy", Geopolymer, vol. 2, pp. 149–166 (1988).

PROCESS FOR OBTAINING A GEOPOLYMERIC ALUMINO-SILICATE AND PRODUCTS THUS OBTAINED

FIELD OF INVENTION

The invention relates to a process for obtaining a geopolymer of the alkaline poly(sialate-disiloxo) family (M)-PSDS of formula

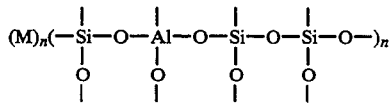

where "M" represents at least one alkaline cation and "n" the degree of polymerisation.

BACKGROUND OF THE INVENTION

The geopolymeric alumino-silicates have been grouped in three families depending on the atomic ratio Si/Al which may be 1, 2 or 3. With the most commonly used simplified notation, a distinction is made between

| poly (sialate) | $M_n$–(Si—O—Al—O)$_{\overline{n}}$ | or (M)—PS, |
|---|---|---|
| poly (sialate-siloxo) | $M_n$–(Si—O—Al—O—Si—O)$_{\overline{n}}$ | or (M)—PSS, |
| poly (sialate-disiloxo). | $M_n$–(Si—O—Al—O—Si—O—Si—O)$_{\overline{n}}$ | or (M)—PSDS |

In several scientific papers, for instance "Geopolymer: room temperature ceramic matrix composites" published in Ceram. Eng. Sci. Proc., 1988, Vol. 9 (7-8), pp. 835–41, cf. Chemical Abstracts 110-080924, or "Geopolymer Chemistry and Properties" published in Geopolymer '88, Vol. 1, pp. 18–23, University of Technology, Compiegne, France, or the international patent publication WO 88/02741 (U.S. Pat. No. 4,888,311), the prior art discloses the uses of poly(sialates) Mn(—Si—O—Al—O), (Na)-PS/(K)-PS and poly(sialate-siloxo) Mn(—Si—O—Al—O—Si—O—), i.e. (Na)-PSS/(K)-PSS. It does not deal with any process for producing poly(sialate-disiloxo) Mn(—Si—O—Al—O—Si—O—Si—O—)n, i.e. (M)-PSDS.

SUMMARY OF INVENTION

The present invention provides a method for the preparation of this geopolymer type.

Alumino-silicate geopolymers have a tridimensional structure and belong to the category of zeolites and feldspathoids. For these materials it is known that thermal stability is a function of the ratio Si/Al. The higher this ratio, the higher their stability. Therefore, any worker in the field will understand the interest provided by the use of geopolymers of the type (M)-PSDS, i.e. Mn(—Si—O—Al—O—Si—O—Si—O—), with the ratio Si/Al=3 in comparison with (M)-PSS, i.e. Mn(—Si—O—Al—O—Si—O—), with the ratio Si/Al=2 and (M)-PS, i.e. Mn(—Si—O—Al—O—), with the ratio Si/Al=1.

The prior art tells us that silicon rich zeolites are, like all zeolites, produced in hydrothermal conditions and in very dilute reactive solutions. Molar ratio $M_2O:H_2O$ ranges from 1:50 to 1:100 and the zeolites obtained are very porous powders.

In contrast, geopolymers are binders which are used to agglomerate fillers or impregnate fibers and fabrics for the manufacture of ceramic like items; the prior art concerning the fabrication of geopolymers, for instance the patents U.S. Pat. No. 4,349,386 (EP 026.687), U.S. Pat. No. 4,472,199 (EP 066.571), U.S. Pat. No. 4,888,311 (EP 288.502), tells us that the production of geopolymers is carried out in high concentrated reactive medium and with a molar ratio $M_2O:H_2O$ which is higher than 1:15.5 for $Na_2O$ and in the order of 1:12.0 for $K_2O$.

In the description of this invention, the term "geopolymer binder" or "hardening of a geopolymeric resin" relates to a hardening process which results from an internal polycondensation or hydrothermal reaction, as opposed to the hardening of alkaline-silicate-based binders which generally harden by simple drying.

There has been, so far, no known method for the production of a reactive mixture providing a ratio Si/Al=3 associated with a molar ratio $M_2O:H_2O$ higher than 1:17.5. In this invention, the silicon involved in the chemical reaction comes from soluble alkaline silicate whose molar ratio $SiO_2:M_2O$ is higher than 4.0:1.0 and whose dry solid matter concentration is higher than 60% by weight. In contrast, industrial alkaline silicates are usually highly diluted with a dry matter concentration lower than 25% by weight and do not enable the production of the reactional mixture claimed in the present invention.

The second object of this invention is to provide a method for obtaining an alkaline silicate solution whose molar ratio $SiO_2:M_2O$ is higher than 4.0:1.0 and whose dry solid matter concentration is higher than 60% by weight.

DETAILED DESCRIPTION OF EMBODIMENTS

The method of this invention provides an alumino-silicate geopolymer whose composition expressed in terms of oxides and in fully hydrated form is:

$$yM_2O:Al_2O_3:xSiO_2:wH_2O$$

where $M_2O$ is $K_2O$ and/or $Na_2O$, "w" has a value at most equal to 3, "x" has a value comprised between 5.5 and 6.5, "y" has a value comprised between 1.0 and 1.6, the said geopolymer belonging essentially to the family of alkaline poly(sialate-disiloxo), (M)-PSDS, with the formula

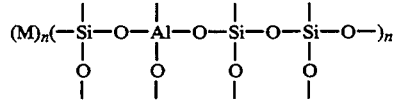

where "M" is at least one alkaline cation and "n" the polymerization degree. The method consists of forming a geopolymeric resin from a reactional mixture containing:

a) an aqueous solution of alkaline silicate with a molar ratio $SiO_2:M_2O$ between or equal to $SiO_2:M_2O$ 4.0:1 and 6.6:1 the concentration of which is over 60% wt and where the initial viscosity at 20° C. is 200 centipoises, then increases but does not exceed 500 centipoises before 5 hours at 20° C.;

b) an alumino-silicate oxide ($Si_2O_5$, $Al_2O_2$) in which the Al cation is in coordination (IV-V), as determined by the MAS-NMR spectrum for $^{27}Al$, the said oxide being in such a quantity that the molar ratio $Al_2O_3:SiO_2$ is between or equal to $Al_2O_3$:$SiO_2$ 1:5.5 and 1:6.5, and then allowing the said geopolymeric resin to cure.

The inventors were surprised to discover that it is indeed possible to produce a concentrated alkaline silicate solution very rich in $SiO_2$, provided that the raw material used for this purpose is a type of silica fume, called thermal silica, different from amorphous silicas manufactured by condensing silane vapors or by precipitating silica solutions.

In the present invention, the term thermal silica fume designates exclusively the amorphous silica obtained by condensing SiO vapors resulting from very high temperature electro-fusion of silicious materials, generally at about 2000° C.; the said alkaline silicate is essentially obtained by dissolving the said thermal silica in a concentrated solution of NaOH and/or KOH.

In a preferred example of the invention, the thermal silica fume is prepared by electro-fusion of zircon sand. The obtained thermal silica fume contains at most 10% by weight $Al_2O_3$ and at least 90% by weight $SiO_2$. It has a chemical formula comprised between ($13Si_2O_5,Al_2O_2$) and ($16Si_2O_5,Al_2O_2$), representing an alumino-silicate oxide with Al in coordination (IV), with additional amorphous silica $SiO_2$. In the following part of this specification the alumino-silicate oxide which characterises this thermal silica is written with the formula ($15Si_2O_5,Al_2O_2$), however, without excluding other thermal silica fumes with compositions containing at most 10% by weight $Al_2O_3$ and at least 90% by weight $SiO_2$.

Silica fumes manufactured by electro-fusion of other silicious compounds, for example ferro-silicon silica fume, may also be used. In this latter case, the silica fume must be treated in order to remove carbon and metallic silicon.

The properties of alkaline silicates are well disclosed in the prior art. For example, a paper published in *Industrial and Engineering Chemistry*, Vol. 61, N.4, April 1969, pp. 29-44, "Properties of Soluble Silicates", outlines the physical properties of alkaline silicate solutions.

The major differences between alkaline silicate solutions of the prior art and those obtained in the present invention are displayed in the following table:

Viscosity at 20° C. and concentration for soluble alkaline silicates:

|  | molar ratio |  | viscosity | concentration |
|---|---|---|---|---|
| prior art | $SiO_2:Na_2O$ | 4.0:1 | 200 cp | 25% |
|  | $SiO_2:K_2O$ | 4.5:1 | 200 cp | 20% |
| present invention example 1) | $SiO_2:K_2O$ | 5.6:1 | 200 cp | 69% |

Those soluble silicates produced with the method of the present invention are not stable with time. Their viscosity increases with temperature. Viscosity values help to differentiate between 4 different steps a), b), c) and d).

In step a), particles of thermal silica ($15Si_2O_5,Al_2O_2$) become disaggregated into a sol. The viscosity decreases and reaches a minimum value of 200 cp at 20° C.

Step b) represents the digestion or dissolution phase. It is endothermic and can be accelerated by heating. It lasts 4-5 hours at 20° C. and the viscosity increases up to 500 cp.

Geopolymerization starts in step c). It lasts about 10 hours at 20° C. The viscosity increases slowly up to 2,500-3,000 cp. This viscosity value determines the upper limit under which the geopolymeric binder remains usable. It is called "pot-life".

Then in step d), the viscosity increases rapidly; this is the setting phase.

The pot-life is sufficiently long to implement the main object of the present invention, namely the geopolymerization of poly(sialate-disiloxo)(M)-PSDS,Mn(—Si—O—Al—O—Si—O—Si—O—)n. This main object implies the dissolution of thermal silica ($15Si_2O_5,Al_2O_2$). If, for any reason, the dissolution step is shorter, then the obtained geopolymer does not belong to the poly(sialate-disiloxo) type (M)-PSDS, but rather to the poly(sialate-siloxo) type (M)-PSS with undissolved thermal silica ($15Si_2O_5,Al_2O_2$) in it.

The second reagent required to implement the main object of the present invention is an alumino-silicate oxide ($Si_2O_5,Al_2O_2$) in which the Al cation is in (IV-V) fold coordination, as determined by MAS-NMR spectrography for $^{27}Al$; this alumino-silicate oxide ($Si_2O_5,Al_2O_2$) is obtained by thermal treatment in an oxidizing medium of natural hydrated alumino-silicates, in which the cation Al is in (VI)-fold coordination, as determined by MAS-NMR spectrography for $^{27}Al$. Thus the MAS-NMR spectrum for $^{27}Al$ shows 2 peaks, one around 50-65 ppm characteristic of 4-coordinated Al, the other around 25-35 ppm which some workers attribute to (V)-fold coordinated Al. We shall, in what follows, adopt the convention of mixed coordination Al(IV-V) for this oxide ($Si_2O_5,Al_2O_2$).

The prior art tells us how to produce alkaline silicate solutions with silica fume.

However, the prior art is aimed at manufacturing stable solutions which may be stored and used commercially as silicate solutions. This explains why the molar ratios are lower than 3.5:1, in the prior art, instead of being comprised between 4.0:1 and 6.5:1 as required in the present invention.

For example, the patents EP 059.088 or JP 74134599 (Chemical Abstracts 082:142233, 1975), JP 75140699 (Chemical Abstracts 084:137974, 1976) disclose processes for the manufacture of foundry binders with ferro-silicon silica fumes.

Silica fumes have also been used as ultra-fine fillers in (M)-PSS,Mn(—Si—O—Al—O—Si—O)n geopolymers.

In U.S. Pat. No. 4,888,311 (WO 88/02741), use is made of ultra-fine silicous and/or aluminous and/or silico-aluminous elements, with grain size lower than 5 microns, preferably lower than 2 microns. The specification claims that these elements are used as fillers which do not become dissolved in the geopolymeric binder, but only react at their surface.

Optical microscopy and MAS-NMR investigations of (K)-PSS type geopolymers reveal that silica fume is in an insoluble state, with microspheres lower than 0.5 microns in dimensions still remaining in the hardened material. Only later, does silica fume become slowly digested within the solidified material (cf. "Structural Characterization of Geopolymeric Materials with X-Ray Diffractometry and MAS-NMR Spectroscopy", *Geopolymer* '88, Vol. 2, pp. 149-166, and Abstracts Session B NR8, Geopolymer '88, Vol. 1, p. 6.).

Ferro-silicon silica fumes improve the properties of hydraulic binders like Portland cement. It is therefore natural to find their uses in geopolymeric-based portland cements.

U.S. Pat. No. 4,642,137, for instance, provides some examples comprising silica fume. However, in this case also, the experimental conditions do not permit any dissolution of silica fume which remains a filler. The powder blend is an accelerator for portland cement and, according to the specification Col. 3, lines 48–68, this patent recommends refraining from any use of soluble silicates in conjunction with portland cement.

Various by-products from electro-fusion of silicious minerals, similar to thermal silica, have been used as fillers in (M)-PSS,Mn(—Si—O—Al—O—Si—O—)n type geopolymeric binders.

U.S. Pat. Nos. 4,522,652, 4,533,393, 4,608,795, equivalent to German patents DE 3.246.602, 3.246.619, 3.246.621 disclose the use of oxide blends consisting of condensed $SiO_2$ and $Al_2O_3$ fumes which are by-products of the electro-fusion of corundum, mulites or ferro-silicons. Yet, in these patent applications, for example in U.S. Pat. No. 4,533,393, Col. 4, line 59, it is clearly stated that these oxide blends are insoluble in alkaline hydroxide solutions.

In addition, U.S. Pat. No. 4,533,393, col. 5, line 36 recommends that these binders should be used without any prior maturation. On the other hand, the various silica fumes compositions mentioned in the examples of these patents comprise 7 to 75% by weight $SiO_2$ and 12 to 87% $Al_2O_3$, characteristic for silica fumes which are rich in aluminium oxide and therefore insoluble in alkaline solutions.

In contrast, in the present invention, thermal silica fumes contain less than 10% by weight $Al_2O_3$, generally less than 5% by weight, and more than 90% by weight $SiO_2$, generally more than 94%. A sufficient maturation time allows these silica fumes to dissolve in alkaline hydroxide solutions.

The prior art also describes the use of numerous alumino-silicate binders in the agglomeration of foundry sands. U.S. Pat. No. 4,432,798, for instance, proposes an alumino-silicate hydrogel with a molar ratio $Al_2O_3:SiO_2$ comprised between 0.07 and 4.20. Formulations whose molar ratios are similar to those claimed in the present invention are not in the liquid form, but rather very viscous, like gels, and set instantly; such a hydrogel, described in Col. 6, line 47 of the patent, with a molar ratio $Al_2O_3:SiO_2$ equal to 1:3, sets after 15–20 seconds at ambient temperature.

In contrast, in the present invention, the viscosity is very low, in the range of 250–300 cp, and the solution may be used for several hours. In U.S. Pat. No. 4,432,798 the concentration of the hydrogel is lower than 50%, generally 25%, whereas in the present invention the concentration is higher than 60%, generally higher than 70% and the viscosity of the geopolymeric resin remains low.

The prior art also describes methods to manufacture poly(alumino-silicates) with an atomic ratio Si:Al higher than 2:1. U.S. Pat. No. 4,213,950, for instance, describes the production of poly(alumino-silicate) with the atomic ratio Si:Al=3. The process set forth in this patent deals with the fabrication of highly porous powders for catalysts, sorbent, detergent uses, products very similar to crystalline zeolite powders, the raw materials being alkaline aluminates and silicic acid.

In contrast, the object of the present invention relates to a method for obtaining a geopolymeric resin with binding properties which are used to agglomerate fillers or impregnate fibers and fabrics, for the manufacture of ceramic like items stable up to 1100° C., whose matrix is based on a geopolymer of the alkaline poly(sialate-disiloxo) family (M)-PSDS of formula

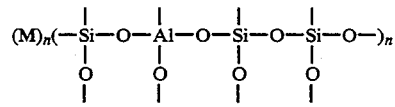

The geopolymeric binder obtained according to the method described in the present invention provides rheological properties sufficient to produce, with known technologies, films and threads which are made of geopolymers of the alkaline poly(sialate-disiloxo) family (M)-PSDS of formula

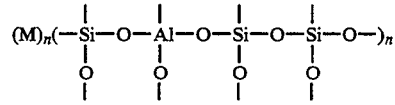

The viscosity of the geopolymeric binder claimed in the present invention increases with time and it cannot be stored. Therefore, the preferred method of the invention will consist in dissolving in several steps the thermal silica fume ($15Si_2O_5,Al_2O_2$), allowing convenient storage of the various ingredients.

In the preferred method for obtaining a geopolymer of the alkaline poly(sialate-disiloxo) family (K)-PSDS of formula

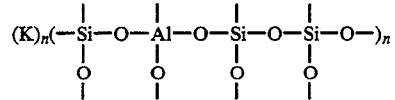

the geopolymeric resin is produced after having prepared separately:
a) an aqueous potassium silicate solution with a molar ratio $K_2O:SiO_2$ 1:1 with a 50% concentration;
b) a powder comprising the alumino-silicate oxide ($Si_2O_5,Al_2O_2$) and the thermal fume silica ($15Si_2O_5 Al_2 O_2$);

The geopolymeric resin resulting from the mixture of a)+b) has a water content lower than 30% by weight, the initial viscosity being in the 350–500 centipoises range and the oxide molar ratio comprised between or equal to:

| | |
|---|---|
| $K_2O:SiO_2$ | 1:4.0 and 1:6.5 |
| $Al_2O_3:SiO_2$ | 1:5.5 and 1:6.5 |
| $K_2O:H_2O$ | 1:7.0 and 1:12.0 |

Maturation or aging of the said geopolymeric resin dissolves the said thermal silica ($15Si_2O_5,Al_2O_2$); during the first step the viscosity decreases to reach a minimum at 250–300 centipoises, then it increases slowly up to 500 centipoises during the dissolution step and reaches 2500–3000 centipoises in the geopolymerization step.

Setting speed is known to be a function of temperature. However, setting speed of (M)-PSDS obtained in the present invention is greatly increased when compared with the setting speed of poly(sialate-siloxo)K-PSS/K-PS type geopolymer disclosed in the U.S. Pat. Nos. 4,349,386/4,472,199. It is in the order of only 30 minutes at 60° C. (Example 2) compared with 2-3 hours at 60° C., respectively. Setting time at 100° C. is only 15 minutes (Example 6), even if the "pot-life" is as long as 12 hours at 20° C.

In the geopolymeric resin, the molar ratio $K_2O:Al_2O_3$ is generally comprised between or equal to:

$K_2O:Al_2O_3$ 1:1 and 1.6:1

When the molar ratio $K_2O:Al_2O_3 = 1:1$, the poly(sialate-disiloxo)(K)-PSDSKn(—Si—O—Al—O—Si—O—Si—O—)n consists of $SiO_4$ and $AlO_4$ tetrahedra from type Q4, as determined by MAS-NMR spectroscopy. The geopolymer structure is entirely tridimensional.

When the molar ratio $K_2O:Al_2O_3$ is in the order of 1.3:1 or higher, the obtained geopolymer is less reticulated and contains $SiO_4$ from type Q3 only. It is assumed that the film-forming properties of the geopolymeric resin are due to this geopolymer type.

When the molar ratio $K_2O:Al_2O_3$ is too high, this can lead to the production of Kn(—Si—O—Al—O—Si—O—Si—O—)n geopolymers with a linear structure where $SiO_4$ is of type Q2; with aging, these linear geopolymers can depolymerise and migrate throughout the matrix and occasionally induce surface defects on the manufactured ceramic items.

The addition of stabiliser or any other setting agent used in alkaline-silicate-based binders eliminates such defects. The addition, for instance, of 2.5% to 3.5% by weight of ZnO in the reactional mixture prevents from any migration of unstable soluble linear alumino-silicate throughout the geopolymeric matrix.

Alkaline hydroxide is either NaOH, or KOH or a mixture NaOH+KOH, but KOH is preferred. According to the nature of the alkaline silicate, the poly(sialate-siloxo)(M)-PSDSMn(—Si—O—Al—O—Si—O—Si—O—)n is either of the type (Na)-PSDS with sodium silicate, or of the type (K)-PSDS with potassium silicate, or eventually of the type (Na,K)-PSDS when both sodium and potassium silicates are produced in the reactional mixture.

The following examples are illustrative of the present invention. They in no way reflect a limit to the overall scope of the invention as set out in the claims. All oxide ratios are molar ratios and all parts are by weight.

The thermal silica $(15Si_2O_5,Al_2O_2)$ used in the examples results from the condensation and cooling of SiO and AlO vapors exhausting during electro-fusion of zircon sand. Chemical composition of this thermal silica is (main oxides parts by weight):

| | |
|---|---|
| $SiO_2$ | 94.24 |
| $Al_2O_3$ | 3.01 |
| CaO | 0.04 |
| L.o.I. | 0.95 |

EXAMPLE 1

A potassium silicate solution is prepared containing

| | |
|---|---|
| thermal silica | 152 g |
| KOH | 50 g |
| water | 82.4 g |

To minimize any exothermic self-heating of the mixture, KOH is added to water and the solution stored in the refrigerator until it reaches 5° C. Then, thermal silica $(15Si_2O_5,Al_2O_2)$ is added, the temperature being maintained at 5° C. during 90 minutes, and then brought to ambient temperature; viscosity is 200 cp. When the temperature of the mixture is kept at 20° C., the solution thickens slowly to reach 500 cp, after 5 hours. This mixture has following molar ratio:

| | |
|---|---|
| $SiO_2:K_2O$ | = 5.6:1 |
| $K_2O:H_2O$ | = 1:11.2 |

The solid concentration is 69% by weight.

EXAMPLE 2

To the solution of Example 1), is added alumino-silicate oxide $(Si_2O_5,Al_2O_2)$ with the Al cation in (IV-V)-fold coordination, as determined by $^{27}Al$ MAS-NMR spectroscopy, the said oxide being added to the reactional mixture in quantities yielding the following molar ratio $Al_2O_3:SiO_2$ 1:6.10

The viscosity of the obtained geopolymeric resin is 450 centipoises; it is cast into a mold and cured at 60° C., for 30 minutes, then demolded and dried at 60° C. The compound has the following chemical formula:

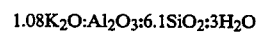

MAS-NMR spectrum displays $SiO_4$ and $AlO_4$ tetrahedra from type Q4. The molar ratio is $K_2O:Al_2O_3 = 1.08:1$ which means that the obtained geopolymer is a tridimensional poly(sialate-disiloxo)(K)-PSDSKn(—Si—O—Al—O—Si—O—Si—O—)n.

EXAMPLE 3

A potassium silicate solution is prepared with thermal silica $(15Si_2O_5,Al_2O_2)$ and KOH, the obtained molar ratio is $K_2O:SiO_2=1$ and the solid concentration $SiO_2+K_2O$, is 50%. This solution remains stable for a long time and may be stored. Amorphous $SiO_2$ can be used in place of thermal silica $(15Si_2O_5,Al_2O_2)$.

EXAMPLE 4

To the solution of Example 3), is added thermal silica $(15Si_2O_5,Al_2O_2)$ and alumino-silicate oxide $(Si_2O_5,Al_2O_2)$ with the Al cation in (IV-V)-fold coordination, as determined by $^{27}Al$ MAS-NMR spectroscopy, the said oxide being added to the reactional mixture in quantities yielding following molar ratio $Al_2O_3:SiO_2$ 1:6.28 and

| | |
|---|---|
| $K_2:SiO_2$ | 1:4.04 |
| $K_2O:H_2O$ | 1:8.4 |
| $K_2O:Al_2O_3$ | 1:1.5 |

To 100 parts by weight of this reactional mixture is added 3.2 parts by weight of ZnO. The obtained geopolymeric resin has a water content of 26%; when its viscosity reaches 1500 centipoises, it is cast in a mold and cured at 60° C., for 30 minutes, then demolded and dried at 60° C. The compound has the following chemical formula:

1.5K$_2$O:Al$_2$O$_3$:6.28SiO$_2$:2.8H$_2$O

MAS-NMR spectrum displays SiO$_4$ and AlO$_4$ tetrahedra from type Q4, together with SiO$_4$ tetrahedra from types Q3 and Q2. The molar ratio K$_2$O:Al$_2$O$_3$=1.5:1 which means that the obtained geopolymer is a tridimensional poly(sialate-disiloxo)(K)-PSDS K$_n$(—Si—O—Al—O—Si—O—Si—O)n containing also some linear bidimensional elements.

EXAMPLE 5

Viscosity measured at 40° C. for the geopolymeric resin of Example 4) shows the following 4 steps:

| | Viscosity in centipoises after elapsed time of | | | | | |
|---|---|---|---|---|---|---|
| | 0 min | 15 min | 1 h 15 | 2 h 30 | 3 h | 4 h |
| viscosity | 320 | 230 | 600 | 8.10$^4$ | 12.10$^4$ | 80.10$^4$ |
| step | a) | b) | c) | d) | | |

EXAMPLE 6

After maturation step b) (dissolution step), the resin of Example 4) is used for the impregnation of fabrics or any other fibrous materials, felts and non-wovens. A silicon carbide SiC fabric, 0°-90°, 400 g/m$^2$ is impregnated with 400 g/m$^2$ of the resin of Example 4). A plate consisting of 6 layers is pressed at 100° C. at 3 kg/cm$^2$ for 15 minutes. One obtains a composite material with flexural strength Rf=220 MPa, 50 GPa modulus, classified fire-resistant (mo, Fo according to French norm).

EXAMPLE 7

The composite material of Example 6) is laminated on a woodchip board. There is obtained a fire-resistant panel with excellent mechanical properties. The composite material can also be laminated on any other material such as honey-comb, organic foam or mineral foam.

The fibrous composite materials used in the present invention comprise at least one layer made out of mineral fibers, and/or metallic fibers and/or organic fibers. We can quote, purely as an example and by no means limiting, several fibers which can be impregnated with the resin described in the present invention: ceramic fibers, carbon fiber, kaolin-, SiC-, alumina fibers, cotton and other natural organic fibers, artificial and synthetic fibers, steel fibers, asbestos fiber, mica, glass fiber, rock fiber, boron fiber.

EXAMPLE 8

The resin of Example 4) is matured until viscosity reaches 2500-3000 centipoises, a value which corresponds to the inflection point characteristic for the transition between step c) and step d), that is to say the transition between the step in which the geopolymer structure is bi-dimensional with SiO$_4$ from type Q3, towards the step in which the geopolymer structure is tri-dimensional with SiO$_4$ from type Q4. It is processed with known techniques to produce a 0.1-0.2 mm thick film. The obtained hardened film is thermally stable up to 600° C.

Any workers in the field will understand the usefulness of this process for obtaining temperature stable geopolymers with an atomic ratio Si/Al>2, when compared with the geopolymers of the prior art. The geopolymeric binder of the present invention sets more rapidly, for instance in 15 minutes in a heated press at 100° C., instead of 1 h to 1 h 30 for the prior art, and this property represents a real advantage from an industrial point of view. Also, against the prior art, the fact that there is no need to add fillers to prevent the geopolymeric matrix from cracking makes it possible to keep a very low viscosity in the geopolymeric resin and develop its film-forming property, which is a distinct advantage when fibers or other granular materials are to be impregnated. The process is useful for the manufacture of items in any shape and dimension, withstanding thermal shock with continuous use temperature up to 1100° C., involving the agglomeration of mineral-, metallic and/or organic fillers, the impregnation of fibers, non-wovens, felts or fabrics, with a poly(sialate-disiloxo),(M-PSDS) type geopolymeric resin.

Naturally, various modifications can be introduced to the method described above, by workers in the field, while remaining within the terms of the invention.

We claim:

1. A method for obtaining an alumino-silicate geopolymer whose composition expressed in terms of oxides and in fully hydrated form is:

yM$_2$O:Al$_2$O$_3$:xSiO$_2$:wH$_2$O where M$_2$O is K$_2$O and/or Na$_2$O, "w" has a value at most equal to 3, "x" has a value comprised between 5.5 and 6.5, "y" has a value comprised between 1.0 and 1.6, the said geopolymer belonging essentially to the family of alkaline poly(sialate-disiloxo, (M)-PSDS having the formula

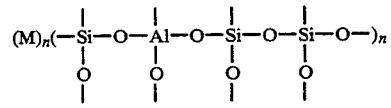

where "M" is at least one alkaline cation and "n" the polymerization degree, wherein the method consists of reacting:
  a) an aqueous solution of alkaline silicate having a molar ratio SiO$_2$:M$_2$O between SiO$_2$:M$_2$O 4.0:1 and 6.6:1 the concentration of which is over 60% wt and where the initial viscosity at 20° C. is 200 centipoises, then increases but does not exceed 500 centipoises within 5 hours at 20° C.;
  b) an alumino-silicate oxide (Si$_2$O$_5$,Al$_2$O$_2$) in which the Al cation is in coordination (IV-V), as determined by the MAS-NMR spectrum for $^{27}$Al, the said oxide being in such a quantity that the molar ratio Al$_2$O$_3$:SiO$_2$ is between Al$_2$O$_3$:SiO$_2$ 1:5.5 and 1:6.5, and then allowing the said geopolymeric resin to cure.

2. A method for obtaining a geopolymer of the alkaline poly(sialate-disiloxo), (M)-PSDS, family having the formula

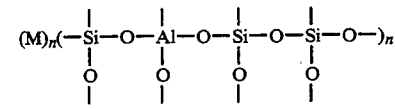

where "M" is at least one alkaline cation including K or Na and "n" the polymerization degree, consisting of reacting an aqueous solution of alkaline silicate having a molar ratio SiO$_2$:M$_2$O between SiO$_2$:M$_2$O 4.0:1 and 6.6:1 the concentration of which is over 60% wt and where the initial viscosity at 20° C. is 200 centipoises, then increases but does not exceed 500 centipoises within 5 hours at 20° C., with an alumino-silicate oxide ($Si_2O_5,Al_2O_2$) in which the Al cation is in coordination (IV-V), as determined by the MAS-NMR spectrum for $^{27}Al$, the said oxide being in such a quantity that the molar ratio $Al_2O_3:SiO_2$ is between $Al_2O_3:SiO_2$ 1:5.5 and 1:6.5, wherein the said alkaline silicate is essentially obtained by dissolving in a concentrated solution of NaOH and/or KOH, thermal silica fume prepared by electro-fusion and condensation of SiO and AlO vapors, the said thermal silica fume containing at most 10% by weight $Al_2O_3$ and at least 90% by weight $SiO_2$ and having a chemical formula between ($13Si_2O_5,Al_2O_2$) and ($16Si_2O_5,Al_2O_2$), representing an alumino-silicate oxide with Al in coordination (IV).

3. A method according to claim 1) wherein the said alkaline silicate is potassium silicate.

4. A method for obtaining a geopolymer of the alkaline poly(sialate-disiloxo) family (K)-PSDS of formula

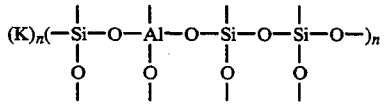

according to claim 3, wherein prior to preparation of the geopolymer separately preparing:
a) an aqueous potassium silicate solution with a molar ratio $K_2O:SiO_2$ 1:1 with a 50% concentration;
b) a powder comprising the alumino-silicate oxide ($Si_2O_5,Al_2O_2$) and the thermal silica fume ($15Si_2O_5 Al_2 O_2$); and mixing a) and b), the geopolymer resulting from the mixture of a)+b) having a water content lower than 30% by weight, the initial viscosity being in the 350–500 centipoises range and the oxide molar ratio in the range of:

| | |
|---|---|
| $K_2O:SiO_2$ | 1:4.0 and 1:6.5 |
| $Al_2O_3:SiO_2$ | 1:5.5 and 1:6.5 |
| $K_2O:H_2O$ | 1:7.0 and 1:12.0; | wherein aging of the said geopolymer dissolves the said thermal silica fume ($15Si_2O_5,Al_2O_2$); the viscosity decreases to reach a minimum at 250–300 centipoises, then it increases up to 500 centipoises during the dissolution step and reaches 2500–3000 centipoises in the geopolymerization step.

5. A method for obtaining a geopolymer of the family of alkaline poly(sialate-disiloxo) (M)-PSDS having the formula

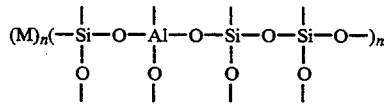

where "M" is at least one alkaline cation and "n" the polymerization degree, according to claim 1, wherein 2.5% to 5.5% by weight of ZnO is added to the reactional mixture to minimize any migration of unstable linear alumino-silicate throughout the geopolymeric matrix.

6. A method according to claim 1) wherein the said alkaline silicate is sodium silicate.

7. An item in any shape and dimension produced by hardening a geopolymer, said geopolymer being produced according to claim 1, comprising agglomerating said geopolymer with a mineral-, a metallic and/or organic filler, or impregnating fibers, non-wovens, felts or fabrics with said geopolymer.

8. Film thread made of a geopolymer of the family of alkaline poly(sialate-disiloxo) (M)-PSDS with the formula

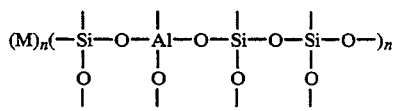

where "M" is at least one alkaline cation and "n" the polymerization degree, produced by streching and hardening a geopolymer resin according to claim 1.

9. Two-constituent composition used for the production of a geopolymer of the alkaline poly(sialate-disiloxo) family (K)-PSDS of formula

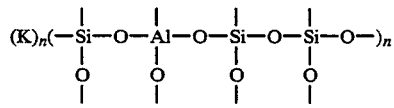

the said composition comprising:
a) an aqueous potassium silicate solution with a molar ratio $K_2O:SiO_2$ 1:1 with a 50% concentration;
b) a powder comprising the alumino-silicate oxide ($Si_2O_5,Al_2O_2$) and thermal fume silica ($15Si_2O_5,Al_2O_2$);

wherein after mixture of the said two constituents, the oxide molar ratio is comprised between

| | |
|---|---|
| $K_2O:SiO_2$ | 1:4.0 and 1:6.5 |
| $Al_2O_3:SiO_2$ | 1:5.5 and 1:6.5 |
| $K_2O:H_2O$ | 1:7.0 and 1:12.0 |

10. A method according to claim 2, wherein the said alkaline silicate is potassium silicate.

11. A method according to claim 10 for obtaining a geopolymer of the alkaline poly(sialate-disiloxo) family (K)-PSDS of formula

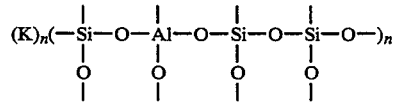

wherein the geopolymer is produced after having prepared separately:
(a) an aqueous potassium silicate solution with a molar ratio $K_2O:SiO_2$ 1:1 with a 50% concentration;
(b) a powder comprising the alumino-silicate oxide ($Si_2O_5,Al_2O_2$) and the thermal silica fume ($15Si_2O_5 Al_2O_2$), the geopolymer resulting from the mixture of (a)+(b) has a water content lower than 30% by weight, the initial viscosity being in the 350-500 centipoises range and the oxide molar ratio comprised between or equal to:

| | |
|---|---|
| $K_2O:SiO_2$ | 1:4.0 and 1:6.5 |
| $Al_2O_3:SiO_2$ | 1:5.5 and 1:6.5 |
| $K_2O:H_2O$ | 1:7.0 and 1:12.0; | wherein aging of the said geopolymer dissolves the said thermal silica ($15Si_2O_5,Al_2O_2$); the viscosity decreases to reach a minimum at 250-300 centipoises, then it increases up to 500 centipoises during the dissolution step and reaches 2500-3000 centipoises in the geopolymerization step.

12. A method according to claim 2 for obtaining a geopolymer of the family of alkaline poly(sialate-disiloxo) (M)-PSDS having the formula

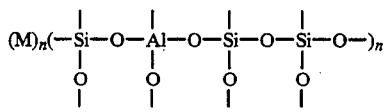

wherein "M" is at least one alkaline cation and "n" the polymerization degree, wherein 2.5% to 5.5% by weight of ZnO is added to the reactional mixture to minimize any migration of unstable linear alumino-silicate throughout the geopolymeric matrix.

13. A method according to claim 3 for obtaining a geopolymer of the family of alkaline poly(sialate-disiloxo) (M)-PSDS having the formula

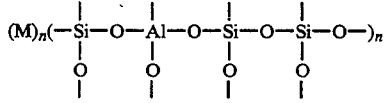

wherein "M" is at least one alkaline cation and "n" the polymerization degree, wherein 2.5% to 5.5% by weight of ZnO is added to the reactional mixture to minimize any migration of unstable linear alumino-silicate throughout the geopolymeric matrix.

14. A method according to claim 10 for obtaining a geopolymer of the family of alkaline poly(sialate-disiloxo) (M)-PSDS having the formula

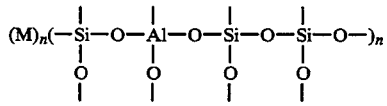

wherein "M" is at least one alkaline cation and "n" the polymerization degree, wherein 2.5% to 5.5% by weight of ZnO is added to the reactional mixture to minimize any migration of unstable linear alumino-silicate throughout the geopolymeric matrix.

15. A method according to claim 2, wherein the said alkaline silicate is sodium silicate.

16. An item in any shape and dimension produced by hardening a geopolymer, said geopolymer being produced according to claim 3, comprising agglomerating said geopolymer with a mineral-, a metallic and/or organic filler, or impregnating fibers, non-wovens, felts or fabrics with said geopolymer.

17. An item in any shape and dimension produced by hardening a geopolymer, said geopolymer being produced according to claim 10, comprising agglomerating said geopolymer with a mineral-, a metallic and/or organic filler, or impregnating fibers, non-wovens, felts or fabrics with said geopolymer.

18. Film or thread made of a geopolymer of the family of alkaline poly(sialate-disiloxo) (M)-PSDS having the formula

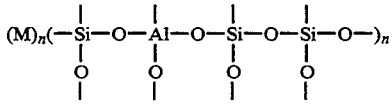

where "M" is at least one alkaline cation and "n" the polymerization degree, produced by stretching and hardening a geopolymer resin according to claim 2.

19. Film or thread made of a geopolymer of the family of alkaline poly(sialate-disiloxo) (M)-PSDS having the formula

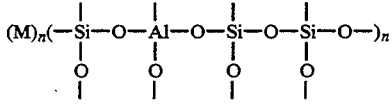

where "M" is at least one alkaline cation and "n" the polymerization degree, produced by stretching and hardening a geopolymer resin according to claim 3.

20. Film or thread made of a geopolymer of the family of alkaline poly(sialate-disiloxo) (M)-PSDS having the formula

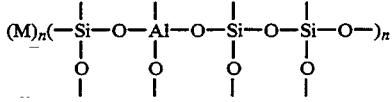

where "M" is at least one alkaline cation and "n" the polymerization degree, produced by stretching and hardening a geopolymer resin according to claim 10.

* * * * *